Dec. 17, 1935.                    S. ESKIN                    2,024,153
                        TEMPERATURE CONTROL DEVICE
                            Filed Oct. 6, 1932
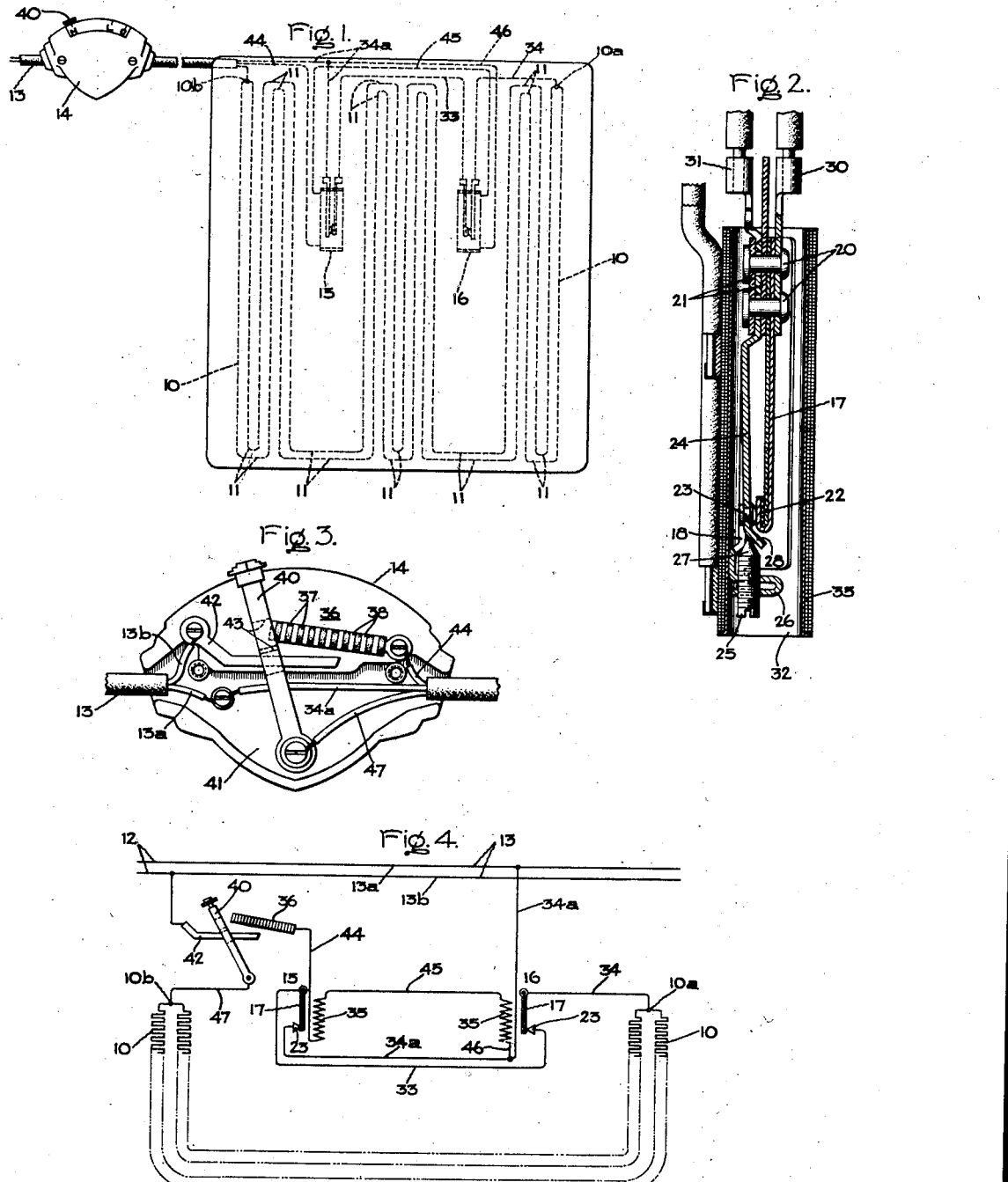
Inventor:
Samuel Eskin,
by Charles E. Tullar
His Attorney.

Patented Dec. 17, 1935

2,024,153

UNITED STATES PATENT OFFICE 2,024,153

TEMPERATURE CONTROL DEVICE

Samuel Eskin, Harbin, China, assignor to General Electric Company, a corporation of New York Application October 6, 1932, Serial No. 636,476

6 Claims. (Cl. 219—20)

My invention relates to temperature control devices, more particularly to devices for controlling an electric circuit in accordance with temperature changes, and has for its object the provision of an improved device of this character.

More specifically, my invention relates to temperature control devices for electric heating pads and the like, although it has application to various other types of electrically heated devices.

One object of my invention is the provision of improved temperature control means arranged so that a relatively large number of preselected temperatures can be maintained in the heating pad.

In carrying my invention into effect in one form thereof, I provide the pad with a thermostat arranged to control the heating circuit of the heating pad responsively to the pad temperature. In order to control the temperature maintained in the pad, I provide an auxiliary source of heat for supplying heat to the thermostat in addition to that which it receives from the pad. This auxiliary source of heat is controlled independently of the operation of the thermostat by suitable control means, such as an adjustable resistance element.

In the operation of my control device, the thermostat is adjusted to open the pad heating circuit at a predetermined temperature. The difference in the temperature maintained in the pad and that for which the thermostat is adjusted to open the heating circuit is proportional to the quantity of heat supplied by the auxiliary source. The greater the quantity of heat supplied by this source, the lower will be the temperature held in the pad; and conversely, the smaller the quantity of heat supplied by the auxiliary source, the higher will be the temperature maintained in the pad.

For a more complete understanding of my invention reference should be had to the accompanying drawing in which Fig. 1 is a plan view of an electric heating pad provided with a temperature control device arranged in accordance with my invention; Fig. 2 is a vertical sectional view of a thermostat used in my temperature control device; Fig. 3 is a plan view of a control member for my control device and heating pad of Fig. 1; and Fig. 4 is a diagrammatic view illustrating the heating pan and temperature control device of Fig. 1.

Referring to the drawing, I have shown my invention in one form as applied to an electric heating pad. It is to be understood, however, that my invention has application to various other types of electrically heated devices.

The heating pad may have any suitable construction, and may be formed of cloth or any other suitable material.

The heating pad is provided with a heating element 10 arranged in a series of convolutions 11 distributed over a comparatively large area of the pad, as shown in Fig. 1. Preferably, the convolutions will be formed of a pair of resistance conductors arranged in parallel relation, as clearly shown in Fig. 1, the extreme ends of the conductors being electrically connected. The resistance conductor 10 may be formed of any suitable material, such as nickel-chromium alloy. The resistance wire may be insulated in any suitable manner, the details of which are not disclosed.

The details of constructions of the heating pad and the means for insulating the resistance conductor 10 have not been shown in detail since any preferred well-known constructions may be used, and since these features form no part of my invention.

The heating element 10 of the pad is energized from a suitable source of electrical supply 12, the element being connected with the supply source by means of a suitable twin supply conductor 13. A suitable control device 14 is inserted in the twin supply conductor 13, one function of the control device being to control the connections between the supply source and the heating circuit of the pad.

The heating circuit of the pad is controlled by means of a pair of thermostats 15 and 16 which are connected in series relation with each other and with the resistance element 10 at one end thereof, as clearly shown in Figs. 1 and 4. While the thermostats are connected at one end of the heating element provided for the pad, they are located at different portions of the pad, as shown in Fig. 1, so as to respond to the temperatures of different portions of the pad. Thus, it will be observed by reference to Fig. 1 that the thermostats 15 and 16 are located on opposite sides of a longitudinal center line of the pad. It will be understood that these thermostats will function to maintain the same pad temperature but that two have been provided for the purpose of increasing the safety of operation of the pad.

Each thermostat comprises a bimetallic bar 17 made of two strips of metal having dissimilar temperature coefficients of expansion, such as brass and steel, the strips being securely brazed or welded together lengthwise. The thermostat is rigidly secured at one end to a frame or support 18 by means of clamping studs or rivets 20 passed through suitable holes provided for them in the bar and in the frame. The thermostat bar 17 is insulated from the frame 18 by means of suitable insulating sheets 21 interposed between the thermostat and the frame and between the opposite side of the frame and the adjacent heads of the studs 20, as clearly shown in Fig. 2. The sheets 21 may be formed of any suitable material, such as mica.

The unsecured end of the bimetallic bar 17 is free to move laterally in response to changes in temperature. This movable end of the bar carries a contact 22 which may be formed integrally with the bar by bending the end of the bar back upon itself, as clearly shown in Fig. 2. This contact cooperates with a fixed contact 23 carried by a contact member 24. The member 24 preferably will be formed integrally with the frame 18 and may be formed as a tongue cut from the metal forming the frame. The contact arm 24 may be moved relative to the frame, but normally will be held in a position fixed with relation to the frame by means of an adjustable abutment or stop 25, shown as a set screw. As shown, the frame 18 is provided at its end adjacent the end of the contact arm 24 with a portion 26 bent upon itself in the form of a U so as to define a seat for receiving the adjusting screw 25. The adjusting screw 25 is provided with a conical head 27 which engages a portion 28 of the contact arm 24 inclined to the general plane of the arm in such manner that when the screw is turned the position of the contact arm and hence of the fixed contact 23 is adjusted.

Each thermostat 15, 16 is provided with a terminal 30 that is in electrical contact with the bimetallic bar 17, and with a terminal 31 that is in electrical contact with the frame 18.

The frame 18, the bimetallic bar 17, the adjusting screw 25 and the terminals 30 and 31, are arranged as a unitary structure. This unitary structure is supported in a tubular casing 32. This casing may be formed by any suitable material having a relatively good heat conductivity, such as copper.

The terminal 30 of the thermostat 15 is electrically connected with the terminal 31 of the thermostat 16 through a conductor 33, while the terminal 30 of the latter thermostat is electrically connected with one terminal 10a of the heating element 10 by means of a conductor 34. The terminal 31 of the thermostat 15 is electrically connected with one of the conductors 13a of the twin supply conductor 13 through a conductor 34a.

By reason of these connections, it will be observed, that the bimetallic bars 17 of the two thermostats are connected in series with each other and with the heating element 10.

In order to control the operation of the thermostat to maintain preselected temperatures in the heating pad, I provide each thermostat with an auxiliary heating element 35 arranged in thermal relation with the bimetallic bar 17 of the thermostat. Referring more particularly to Fig. 2, it will be observed that the heating element 35 is wound in coil form upon the tubular support 32. The heater coils will be formed of any suitable material, such as a nickel-chromium alloy. The turns of the heater coils are electrically insulated in any suitable manner, as by an insulating varnish. Each coil is provided with a pair of terminals 35a.

The heater coils 35 of the thermostats are electrically connected in series with each other, and are energized from the supply source 12. The electrical energy supplied to the heater coils 35 is controlled by means of a suitable resistance element 36 which preferably will be of the carbon pile type. Thus, for example, the resistance element 36 may be formed of alternately arranged carbon and metal discs 37 and 38 secured together in any suitable manner.

Preferably, the control device 14 controlling the connections between the heating pad and the supply source 12, and the rheostat 36 controlling the heaters 35 will be incorporated into a unitary structure, as shown in Fig. 3. As shown in this figure, the control device 14 comprises a control lever 40 pivotally mounted in a suitable insulating housing 41 and cooperating with the carbon pile rheostat 36 and with a suitable contact 42. The pivotally mounted lever 40 is provided with a pair of spring-like contacts 43 and 44 which cooperate respectively with the rheostat 36 and with the contact 42. The contact 42, as shown in Figs. 3 and 4, is electrically connected to one of the leads 13b of the supply conductor 13 from the supply source 12.

One end of the rheostat 36, the right hand end, as viewed in Figs. 3 and 4, is electrically connected with one terminal of the heating coil 35 of the rheostat 15 by means of a conductor 44. The other terminal of this heating coil is electrically connected with one terminal of the heating coil 35 of the thermostat 16 by means of a conductor 45. The other terminal of this thermostat is electrically connected to the other lead 13a of the supply conductor 13 by means of a conductor 46 and the conductor 34a. The contact lever 40, as shown, is electrically connected with one terminal 10b of the heating unit 10 by means of a conductor 47.

It will be observed that by reason of the foregoing connections the heating element 10 is connected in series with the two bimetallic elements 17 of the thermostats 15 and 16 and with the supply source, and that the heating coils 35 of the two thermostats are electrically connected in series with the supply source through the adjustable rheostat 36.

In order to control the energy input to the heating elements 35, it is merely necessary to adjust the position of the control lever 40. It will be observed that while the arm 40 is being adjusted, the circuit will be maintained through the heating element 10 by the contact 42 with which the contact arm has a sliding engagement.

In the operation of my temperature control device, it will be understood that the bimetallic bars 17 will receive heat both from the heating pad and from the auxiliary heating coils 35 provided for the thermostats.

However, when the lever 40 is in its extreme right hand position at the point indicated "O" in Fig. 1, which is the "off" position of the arm, the circuits through the heating coil 10 of the pad and of the thermostat heating coils 35 are deenergized. As the arm 40 is moved from this position toward the position marked "L", which indicates the low heat position of the contact arm, it will engage the rheostat 36 so as to complete an energizing circuit for the heating elements 35. When the contact arm arrives at its low heat position "L", it will engage the contact 42 and complete the heating circuit through the pad resistance element 10. In this position of the arm 40, very little resistance will be included in series with the heating elements 35 and so, the elements will receive maximum energy from the line to deliver their maximum heat output to the bimetallic bars 17. Obviously, the temperature rise in each bimetallic bar is due to a greater extent to heat received from its auxiliary heating element 35 than to that received from the pad itself. Hence, assuming that the thermostats are set to operate to open the heating circuit 10 at 180° F., it is obvious that the pad temperature will not attain 180° F. when the thermostats thus operate, but will have a temperature considerably less than 180°.

The value of the pad temperature at the instant the thermostats function to open the heating circuit depends to a great extent upon the resistance of the pad heating circuit, that of the elements 35 and the effective resistance of the rheostat 36.

In a specific example, assuming that the resistance of the element 10 be 200 ohms, that of the rheostat 36 to be 12,000 ohms with an effective resistance of 3,000 ohms in the low heat position, and that the combined resistances of the heating elements 35 to be 6,000 ohms, each having a resistance of 3,000 ohms, then in the low heat position, the pad will attain a temperature of substantially 110° F., assuming, as before, that the thermostats are set to cut off the heat at 180° F. In this position of the lever 40, each heater coil 35 will deliver approximately .5 watts to its thermostat. It will be understood that as long as the lever 40 is in its low heat position "L", a temperature of substantially 110° F. will be maintained in the pad. That is, when the pad attains a temperature of 110° F. adjacent either thermostat 15, 16 the thermostat will function to cut off the heat, and then to reapply the heat when the pad cools to a temperature below 110° F. In this manner the thermostats function to maintain a substantially constant temperature in the pad.

If the control arm 40 be moved in a counter clockwise direction, more and more effective resistance of the rheostat 36 will be inserted in the energizing circuit of the heating elements 35, and as a result, these elements will impart less and less heat to the thermostat bars 17. In other words, more and more heat must come from the pad to each thermostat in order to actuate it to open the heating circuit of the pad. As before, assuming that each thermostat is adjusted to operate at a temperature of 180° F., the temperature maintained in the pad will gradually be increased from 110° F. to this value as the arm 40 is moved toward the left.

When the arm 40 is moved to the extreme left-hand end of the rheostat all of the effective resistance will be inserted in the heating circuit of the thermostats, and as a result the wattage supplied by each heater 35 will be reduced from .5 watts, its low heat value, to approximately .3 watts in the specific example given above. When the arm 40 reaches its high heat position, indicated "H" in Fig. 1, it will have disengaged or moved off of the carbon pile 36 which operation will deenergize the auxiliary heaters 35. All of the heat necessary to actuate the thermostats to open the pad heating circuit must come from the pad itself. In other words, the pad must operate at a temperature of 180° F. before the thermostats will function to disconnect the heating element 10. In order to reduce the temperature maintained in the pad, it is merely necessary to adjust the arm 40 to a lower heat position.

It will be understood that in any position of the control arm 40, the thermostats will function to maintain a substantially constant corresponding temperature in the pad. If the temperature rises above the selected value, one or both of the thermostats will operate to cut off the heat. On the other hand, if the temperature of the pad falls below the selected value, the thermostats will operate to reapply the heat.

In order to change the temperature setting of the thermostats it is necessary to adjust the position of the fixed contacts 23 by turning the adjusting screws 25. It will be understood that this adjustment usually will be made merely for factory purposes, and that when once the thermostat is adjusted it will be unnecessary to change its adjustment in the normal operation of the pad.

It will be observed that I have provided a temperature control device whereby a very great number of temperatures within a wide range can be maintained in the heating pad 10, and that any one of these temperatures can be secured merely by adjusting the position of the control arm 40.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In an electrically heated device, electrical heating means for said device, an energizing circuit for said heating means, a thermostat in thermal relation with said device so as to receive heat directly therefrom arranged to control said energizing circuit of said heating means responsively to the temperature of said device so as to control said heating means to hold a substantially constant temperature in said device, an auxiliary heating element in thermal relation with said thermostat arranged to apply heat directly thereto in addition to that received directly from said device, a second energizing circuit for said auxiliary heating device independent of said first energizing circuit for said heating means so that the energization of said auxiliary heating device is uninfluenced by the operation of said thermostat controlling said first energizing circuit, and means connected in said second energizing circuit controlling the energy input to said auxiliary heating element to vary its heating effect on said thermostat and thereby vary the temperature setting of said thermostat to hold different preselected temperatures in said device.

2. A temperature control device for electric heating pads and the like comprising a switch in the heating circuit of said pad, a thermostat responsive to the temperature of said pad controlling said switch, a heating element in thermal relation with said thermostat, a circuit for said heating element independent of the pad heating circuit and an adjustable resistance in said circuit for controlling the energy input to said heating element.

3. In an electric heating pad, a heating circuit for said pad, a switch in said heating circuit, a thermostat responsive to the temperature of said pad controlling said heating circuit, a heating element in thermal relation with said thermostat, an energizing circuit for said heating element, an adjustable resistance in said circuit for controlling the energy input to said heating element and a common operating member for said switch and said resistance arranged to close and open said switch to energize and deenergize said heating circuit and to adjust said resistance while said heating circuit is energized so as to control the energy input to said heating element.

4. In an electric heating pad, a heating circuit for said pad, a set of electrical supply conductors for said pad, a thermostat in said pad controlling said heating circuit responsively to the temperature of said pad, an auxiliary heating element in said pad in thermal relation with said thermostat arranged to apply heat directly thereto in addition to that received from said pad, a second set of electrical supply conductors for said auxiliary heating element, means incorporating both sets of said supply conductors into a single supply cord and a common control device in said cord for said sets of conductors including a switch controlling said first set of conductors to open and close said heating circuit, a resistance connected in said second set of conductors to control the energization of said auxiliary heating element and a common control member for operating said switch and for controlling the effective amount of said resistance connected in the circuit of said auxiliary heating element.

5. A temperature control system for electric heating pads and the like provided with a body member and a heating circuit in said body member comprising a set of electrical supply conductors for said heating circuit, a switch controlling said conductors, a thermostat in said body member responsive to the temperature thereof arranged to control said heating circuit, a heating element in said pad in thermal relation with said thermostat, a second set of electrical supply conductors for said heating element, a common supply cord for both of said sets of supply conductors for said heating circuit and said heating element, an adjustable resistance connected in said second set of supply conductors for controlling said heating element, and a common control member in said cord for said switch and said resistance arranged to close and open said switch to energize and deenergize said heating circuit and to adjust said resistance while said heating circuit is energized so as to control the energy input to said heating element.

6. In an electric heating pad, a heating circuit for said pad, a switch in said heating circuit, a thermostat responsive to the temperature of said pad controlling said heating circuit, a heating element in thermal relation with said thermostat, an energizing circuit for said heating element, an adjustable resistance in said circuit for controlling the energy input to said heating element and a common operating member for said switch and said resistance arranged when moved from one position in a predetermined direction first to gradually increase the effective resistance connected in said energizing circuit and then in a predetermined position to close said switch and thereafter when continuously moved in said predetermined direction to gradually increase the effective resistance connected in said energizing circuit.

SAMUEL ESKIN.